(12) United States Patent
Iwamoto et al.

(10) Patent No.: US 12,139,333 B2
(45) Date of Patent: *Nov. 12, 2024

(54) TRANSPORT SYSTEM AND TRANSPORT METHOD

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/508,316

(22) Filed: Nov. 14, 2023

(65) Prior Publication Data

US 2024/0076126 A1 Mar. 7, 2024

Related U.S. Application Data

(63) Continuation of application No. 17/650,906, filed on Feb. 14, 2022, now Pat. No. 11,878,863.

(30) Foreign Application Priority Data

Feb. 16, 2021 (JP) ................. 2021-022714

(51) Int. Cl.
*B65G 1/04* (2006.01)
*B65G 67/02* (2006.01)
*B60P 1/44* (2006.01)

(52) U.S. Cl.
CPC .......... *B65G 1/0407* (2013.01); *B65G 67/02* (2013.01); *B60P 1/445* (2013.01); *B65G 2201/0264* (2013.01)

(58) Field of Classification Search
CPC .............................. B65G 1/0407; B66F 9/063
See application file for complete search history.

(56) References Cited

U.S. PATENT DOCUMENTS

| 10,556,334 | B1 | 2/2020 | Theobald |
| 11,878,863 | B2* | 1/2024 | Iwamoto .............. B25J 11/00 |
| 2018/0265297 | A1 | 9/2018 | Nakano et al. |
| 2019/0276236 | A1* | 9/2019 | Wu .................. B65G 1/0407 |

(Continued)

FOREIGN PATENT DOCUMENTS

| JP | 2016124036 A | 7/2016 |
| JP | 2017185596 A | 10/2017 |

(Continued)

OTHER PUBLICATIONS

Iwamoto et al., U.S. Appl. No. 17/650,906, Non-Final Office Action issued Jan. 24, 2023.

(Continued)

*Primary Examiner* — Kaitlin S Joerger
(74) *Attorney, Agent, or Firm* — Dickinson Wright, PLLC

(57) ABSTRACT

A transport system is a transport system that transports a luggage using a transport vehicle and a transport robot. In a state in which the transport robot and the transport vehicle are connected, the transport robot takes out the luggage from the transport vehicle, or stores the luggage in the transport vehicle.

3 Claims, 10 Drawing Sheets

(56) References Cited

U.S. PATENT DOCUMENTS

| | | | |
|---|---|---|---|
| 2019/0329978 A1* | 10/2019 | Li | G05D 1/0295 |
| 2020/0298404 A1 | 9/2020 | Theobald | |
| 2021/0147147 A1 | 5/2021 | Durai et al. | |
| 2021/0395007 A1* | 12/2021 | Galluzzo | B65G 1/1371 |
| 2022/0234826 A1* | 7/2022 | Takagi | B62D 63/02 |
| 2022/0242708 A1* | 8/2022 | Itozawa | B66F 9/0755 |
| 2022/0258976 A1* | 8/2022 | Iwamoto | B65G 1/1371 |
| 2022/0315084 A1* | 10/2022 | Nishii | B65G 67/02 |

FOREIGN PATENT DOCUMENTS

| | | | |
|---|---|---|---|
| JP | 2019094197 A | 6/2019 | |
| JP | 2019131403 A | 8/2019 | |

OTHER PUBLICATIONS

Iwamoto et al., U.S. Appl. No. 17/650,906, Final Office Action issued May 30, 2023.
Wamoto et al., U.S. Appl. No. 17/650,906, Notice of Allowance issued Sep. 7, 2023.

* cited by examiner

TRANSPORT SYSTEM AND TRANSPORT METHOD

CROSS-REFERENCE TO RELATED APPLICATION

This application is a continuation of U.S. patent application Ser. No. 17/650,906, filed Feb. 14, 2022, which claims priority to Japanese Patent Application No. 2021-022714 filed on Feb. 16, 2021, incorporated herein by reference in its entirety.

BACKGROUND

1. Technical Field

The present disclosure relates to a transport system and a transport method.

2. Description of Related Art

Japanese Unexamined Patent Application Publication No. 2019-094197 (JP 2019-094197 A) discloses a transport system including a transport vehicle and a robot arm.

SUMMARY

When a luggage is taken in and out from a transport vehicle, there is an issue that a load is applied in a direction of taking in and out the luggage, and the transport vehicle may roll over.

The present disclosure has been made to solve such an issue, and an object of the present disclosure is to provide a transport system and a transport method that reduce risk of rollover of the transport vehicle when the luggage is taken in and out from the transport vehicle.

A transport system in the present embodiment is a transport system that transports a luggage using a transport vehicle and a transport robot. In a state in which the transport vehicle and the transport robot are connected, the transport robot takes out the luggage from the transport vehicle or stores the luggage in the transport vehicle.

A transport method in the present embodiment is a transport method for transporting a luggage using a transport vehicle and a transport robot. The transport method includes a step of causing the transport robot to take out the luggage from the transport vehicle or to store the luggage in the transport vehicle in a state in which the transport robot and the transport vehicle are connected.

According to the present disclosure, it is possible to provide a transport system and a transport method that reduce risk of rollover of a transport vehicle when a luggage is taken in and out from the transport vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through an embodiment of the disclosure, but the disclosure according to the scope of the claims is not limited to the following embodiment. Moreover, not all of the configurations described in the embodiment are indispensable as means for solving the problem.

Figure 1:
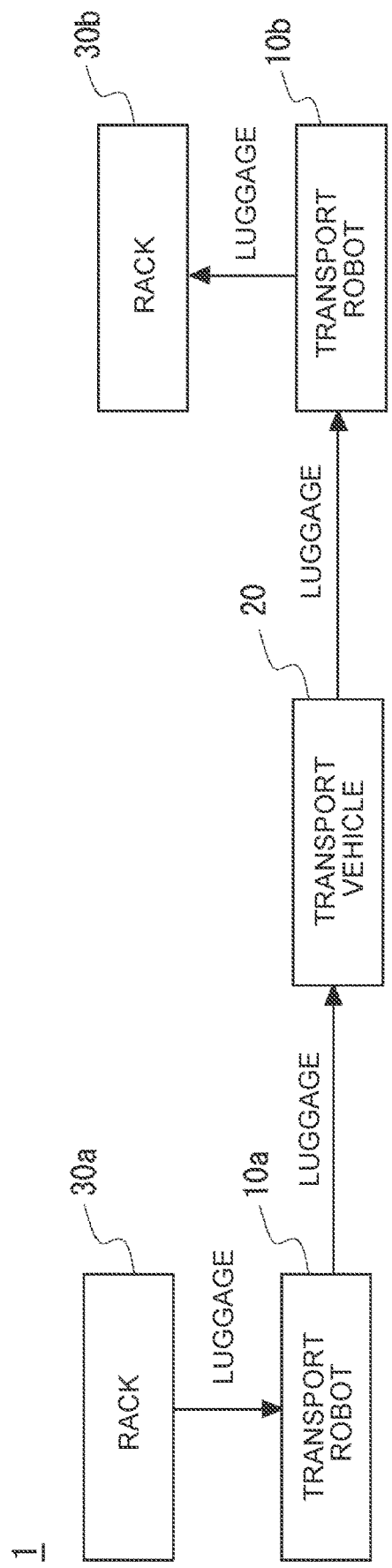
FIG. 1 is a block diagram showing a configuration example of a transport system according to an embodiment.

A transport system according to the embodiment will be described with reference to the drawings. FIG. 1 is a configuration diagram showing a configuration example of the transport system according to the embodiment. A transport system 1 includes transport robots 10a and 10b, a transport vehicle 20, and racks 30a and 30b.

The transport system 1 may be provided with a server that generates a transport route of the transport robots 10a and 10b, and the transport vehicle 20, but the transport robots 10a and 10b, and the transport vehicle 20 may generate a transport route by themselves to perform autonomous movement. A system that does not include a server may also be included in the transport system 1 according to the embodiment.

The transport system 1 transports a luggage from the rack 30a installed at a delivery source to the rack 30b installed at a delivery destination. For example, the delivery source is a warehouse and the delivery destination is a residence. Hereinafter, the racks 30a and 30b may be simply referred to as the rack 30 when they are not distinguished. The structure of the rack 30 will be described below.

The transport vehicle 20 transports the luggage from the delivery source to the delivery destination. The transport vehicle 20 may be an autonomous mobile vehicle. The transport vehicle 20 includes a mechanism for connecting to the transport robots 10a and 10b. The transport vehicle 20 may further have a mechanism for connecting to the racks 30a and 30b. The configuration of the transport vehicle 20 will be described below.

The transport robot 10a autonomously moves in a warehouse or the like that is a delivery source. The transport robot 10a takes out the luggage to be delivered from the rack 30a and stores it in the transport vehicle 20. The transport robot 10b autonomously moves at a residence or the like that is a delivery destination. The transport robot 10b takes out the luggage from the transport vehicle 20 and stores it in the rack 30b. Hereinafter, the transport robots 10a and 10b may be simply referred to as the transport robot 10 when they are not distinguished.

The transport robot 10 includes a mechanism for connecting to the transport vehicle 20. After the transport robot 10a takes out the luggage from the rack 30a, the transport robot 10a stores the luggage in the transport vehicle 20 in a state in which the transport robot 10a is connected to the transport vehicle 20. On the other hand, after the transport robot 10b takes out the luggage from the transport vehicle 20 in a state in which the transport robot 10b is connected to the transport vehicle 20, the transport robot 10b stores, in the rack 30b, the luggage that has been taken out. The configuration of the transport robot will be described below.

Next, the transport vehicle 20 will be described with reference to FIGS. 2 and 3. As a matter of course, the right-handed xyz orthogonal coordinates shown in FIG. 2 and other figures are shown for convenience of describing the positional relationship of the components. Usually, the z-axis positive direction is a vertically upward direction, and the xy plane is a horizontal plane, which is common between the drawings.

Figure 2:
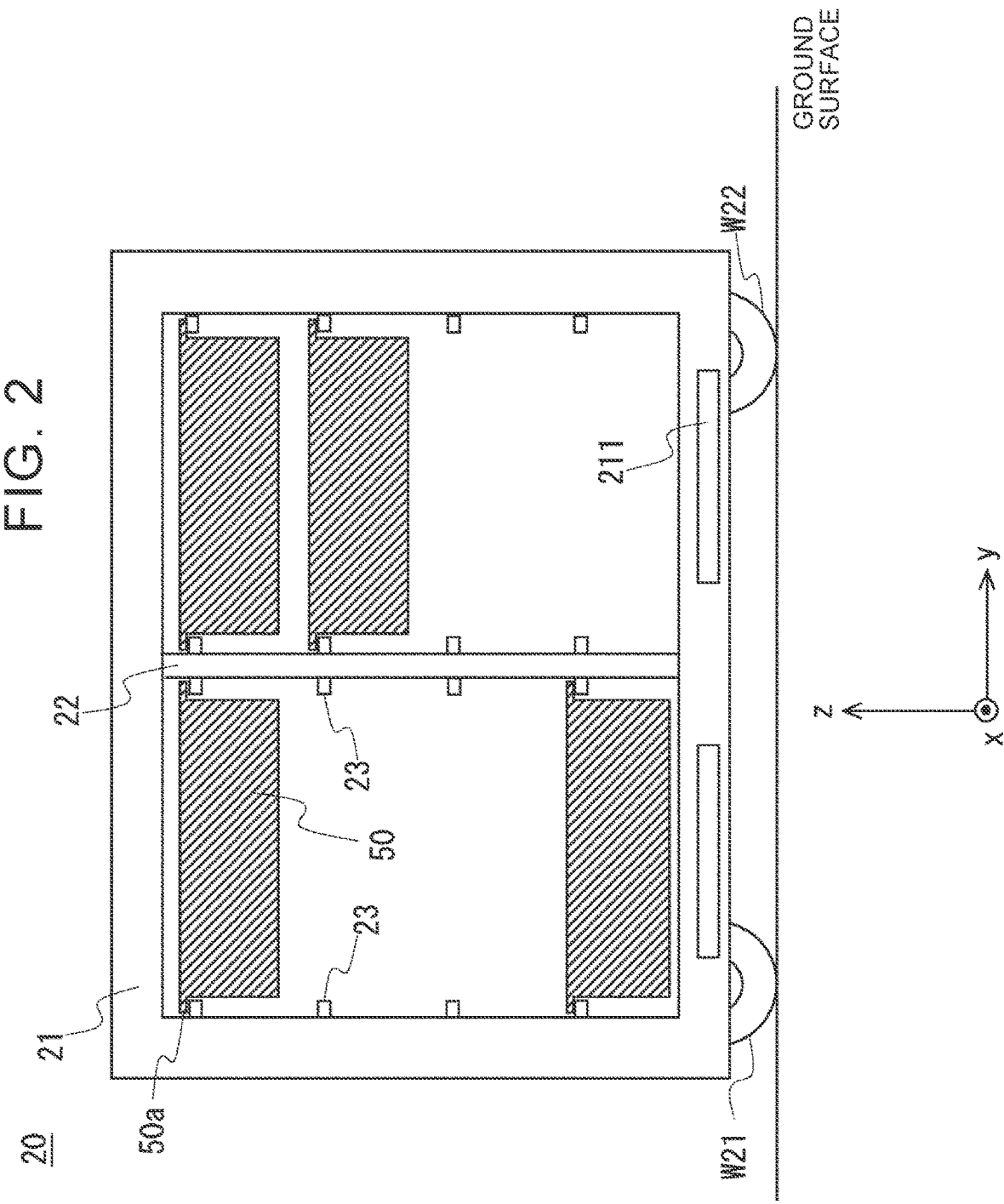
FIG. 2 is a schematic side view showing a configuration of a transport vehicle according to the embodiment.
Figure 3:
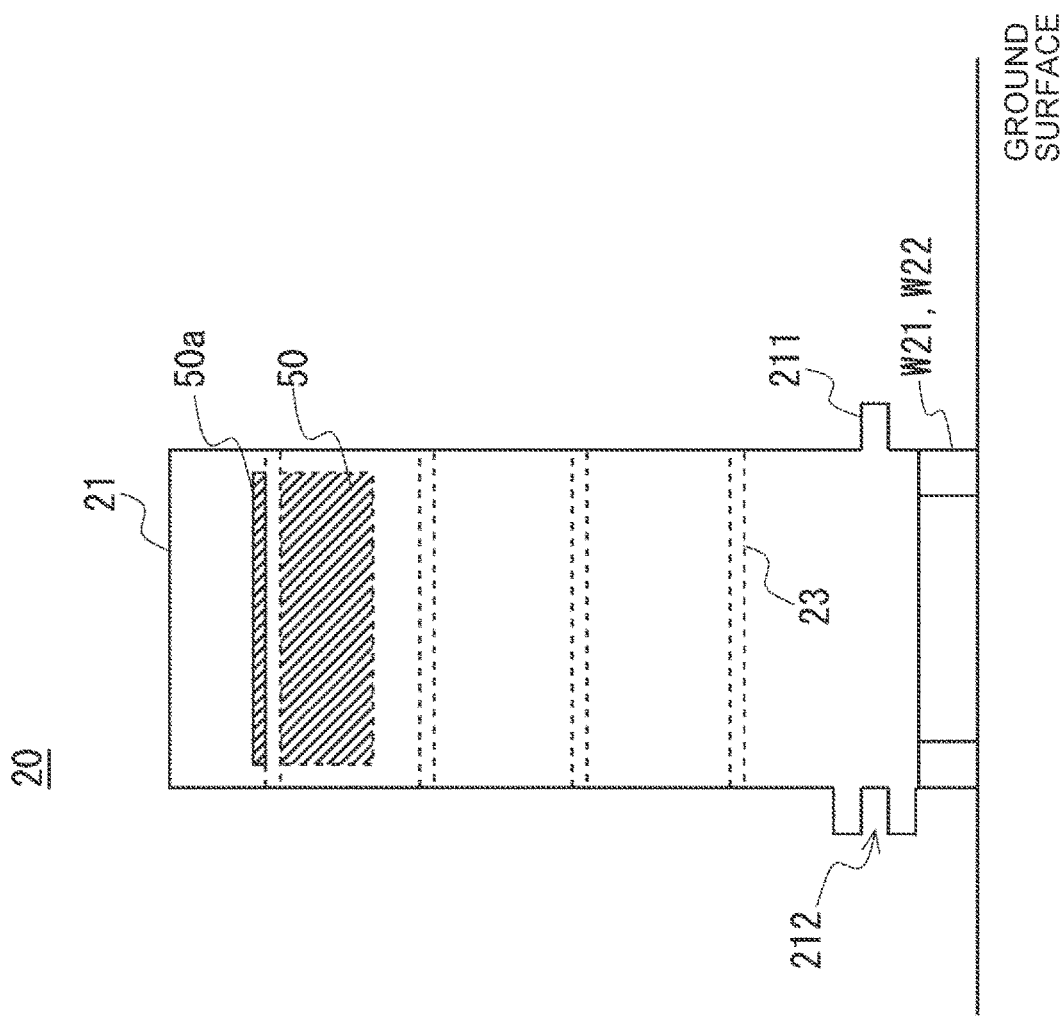
FIG. 3 is a schematic front view showing a configuration of the transport vehicle according to the embodiment.

FIGS. 2 and 3 are a schematic side view and a schematic front view showing the configuration of the transport vehicle 20, respectively, and a luggage 50 is hatched for easy understanding. The transport vehicle 20 may be, for example, an autonomous traveling (unmanned traveling) vehicle. The transport vehicle 20 includes wheels W21, W22, a housing 21, a partition plate 22, and rails 23. The transport vehicle 20 may further include a second connecting mechanism 212. Two pairs of the wheels W21 and W22 are rotatably fixed to the lower side of the housing 21, and are driven by a drive source (not shown) such as a motor.

The housing 21 constitutes a vehicle body of the transport vehicle 20. In an example shown in FIG. 2, the housing 21 is configured such that a top plate provided on a side in the z-axis positive direction, a bottom plate provided on a side in the z-axis negative direction, a front surface plate provided on a side in the y-axis positive direction, and a back surface plate provided on a side in the y-axis negative direction are integrally formed. That is, both of the side surfaces of the housing 21 are open such that the luggage 50 can be taken in and out. A door that can be opened and closed may be provided on each side surface of the housing 21 that is open. Further, one side surface of the housing 21 may be closed.

As shown in FIG. 2, the partition plate 22 is provided such that the partition plate 22 is parallel to the front surface plate and the back surface plate constituting the housing 21 (that is, parallel to the xz plane), and extends from one side surface of the housing 21 to the other side surface of the housing 21. In the example of FIG. 2, one partition plate 22 is provided, but the number of partition plates 22 is not limited at all. Further, the partition plate 22 may not be provided.

As shown in FIG. 2, pairs of the rails 23 are provided so as to extend in a depth direction (x-axis direction) and each of the rails 23 is arranged at equal intervals in a height direction (z-axis direction) on the inner surface of the housing 21 and the partition plate 22. Here, the rails 23 are provided so as to rise substantially vertically from the inner surface of the housing 21 and the partition plate 22. As shown in FIG. 2, the luggage 50 can be taken in and out by sliding a protruding portion 50a on each of the rails 23 that faces adjacent to each other. The protruding portions 50a protrude outward from the luggage 50 in a width direction.

The housing 21 is provided with a first connecting mechanism 211. The first connecting mechanism 211 is provided, for example, below an accommodation space for accommodating the luggage 50. In FIG. 2, the first connecting mechanism 211 is provided for each accommodation space, but each of the first connecting mechanisms 211 may be integrated. The first connecting mechanism 211 is connected to a connecting mechanism 111 included in the transport robot 10, which will be described below. In FIGS. 2 and 3, the first connecting mechanism 211 is formed as a protrusion protruding from the housing 21. In such a case, the connecting mechanism 111 is formed as a recess in a main body portion 11 of the transport robot 10, which will be described below. The first connecting mechanism 211 may be formed as a recess. In such a case, the connecting mechanism 111 is formed as a protrusion in the transport robot 10.

Further, as shown in FIG. 3, the housing 21 may be further provided with a second connecting mechanism 212 for connecting to the rack 30. As in the first connecting mechanism 211, the second connecting mechanism 212 may be formed as a protrusion or a recess. The first connecting mechanism 211 and the second connecting mechanism 212 may be configured to be able to be accommodated in the housing 21. Then, the transport vehicle 20 may have a function of causing the first connecting mechanism 211 and the second connecting mechanism 212 to protrude to the outside of the housing 21.

Figure 4:
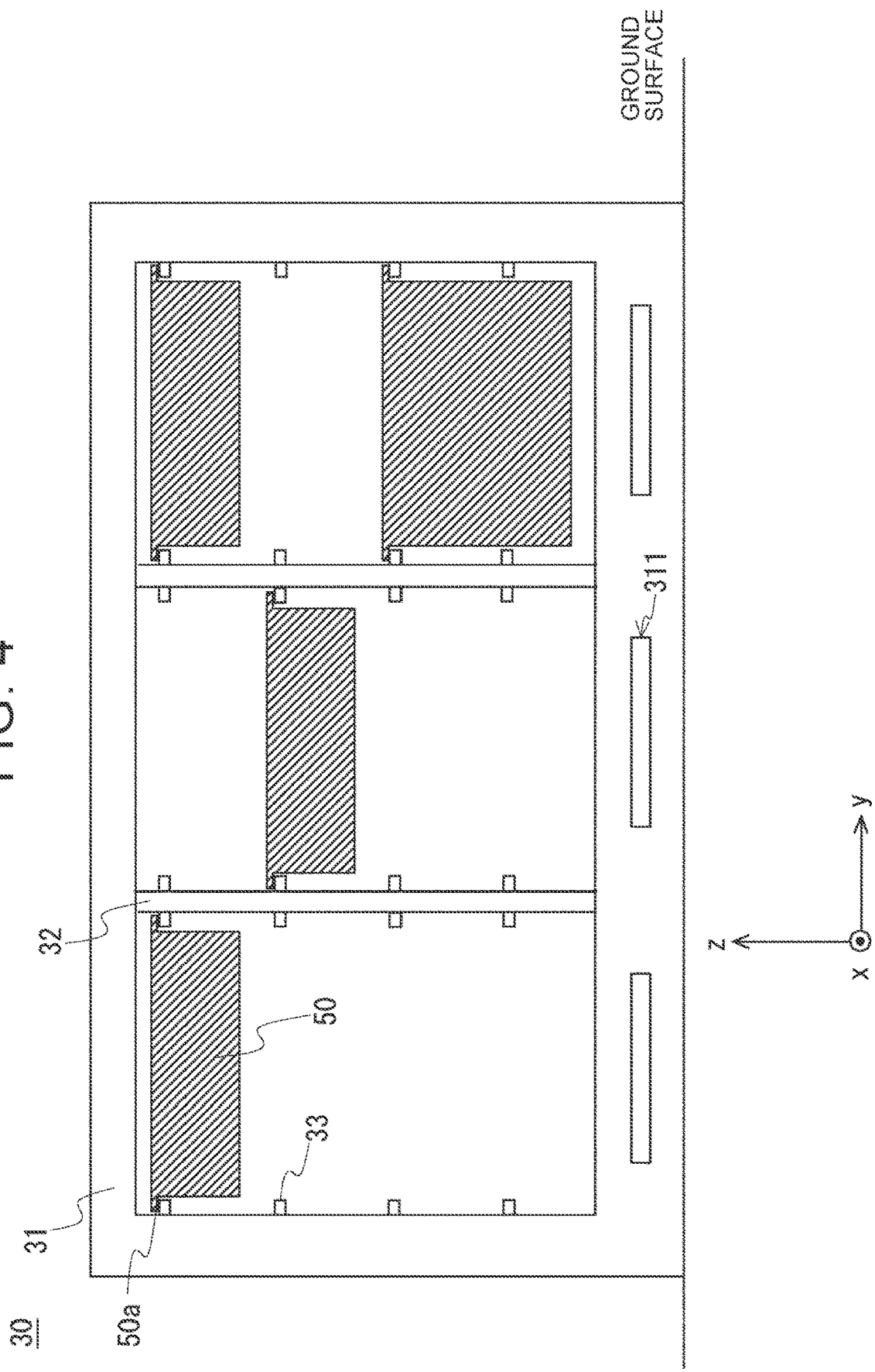
FIG. 4 is a schematic front view showing a configuration of a rack according to the embodiment.
Figure 5:
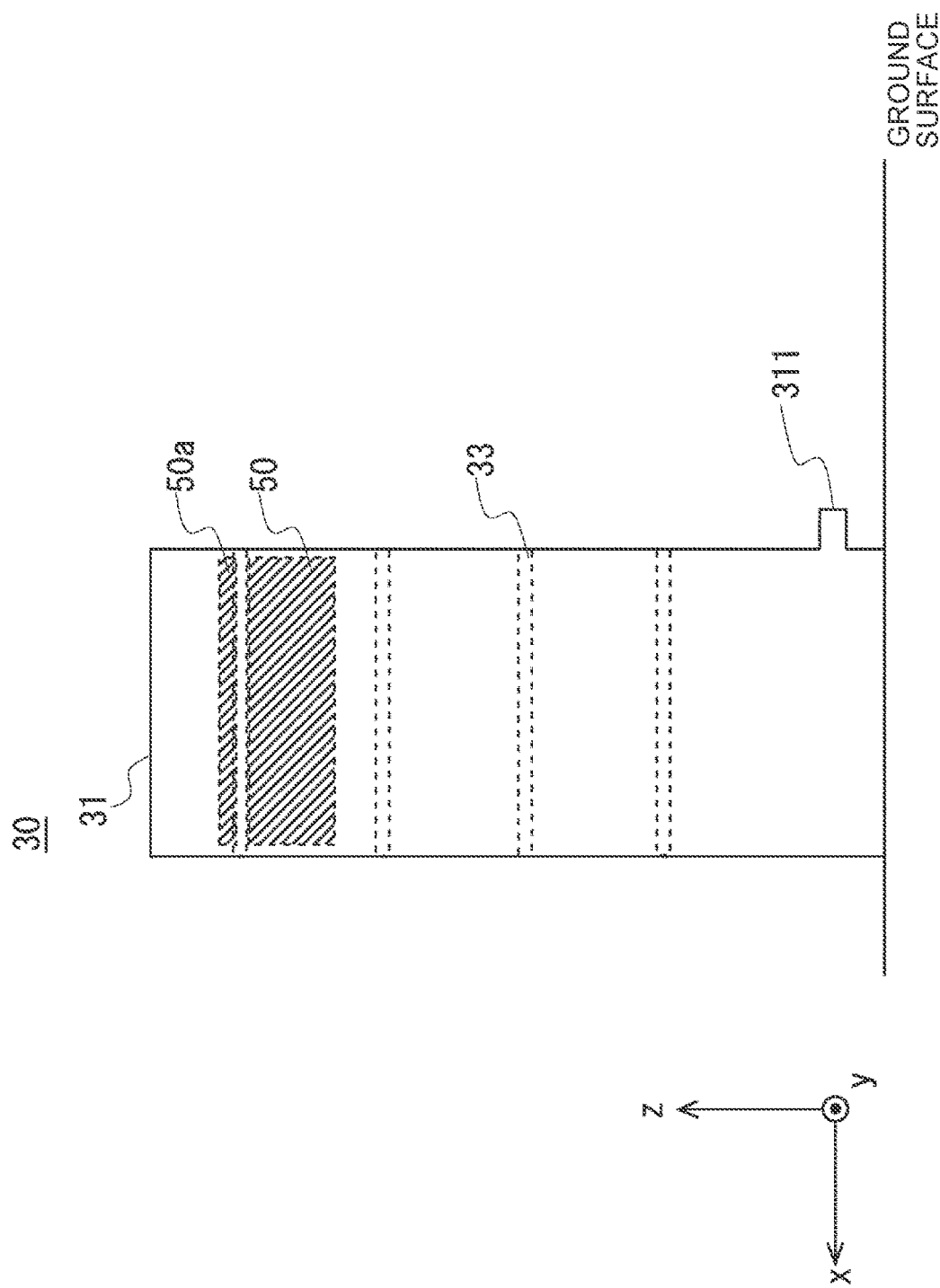
FIG. 5 is a schematic side view showing a configuration of the rack according to the embodiment.

Next, the configuration of the rack 30 will be described with reference to FIGS. 4 and 5. FIGS. 4 and 5 are a schematic front view and a schematic side view showing the configuration of the rack 30, respectively. As shown in FIG. 4, the rack 30 includes a housing 31, partition plates 32, and rails 33. The housing 31, the partition plates 32, and the rails 33 of the rack 30 correspond to the housing 21, the partition plate 22, and the rails 23 of the transport vehicle 20, respectively, and include the same configuration as those of the transport vehicle 20. Therefore, detailed description thereof will be omitted.

The housing 31 may be provided with a connecting mechanism 311 for connecting to the second connecting mechanism 212 of the transport vehicle 20. The connecting mechanism 311 may be formed as a protrusion as shown in FIGS. 4 and 5. Further, the connecting mechanism 311 may be formed as a recess.

Figure 6:
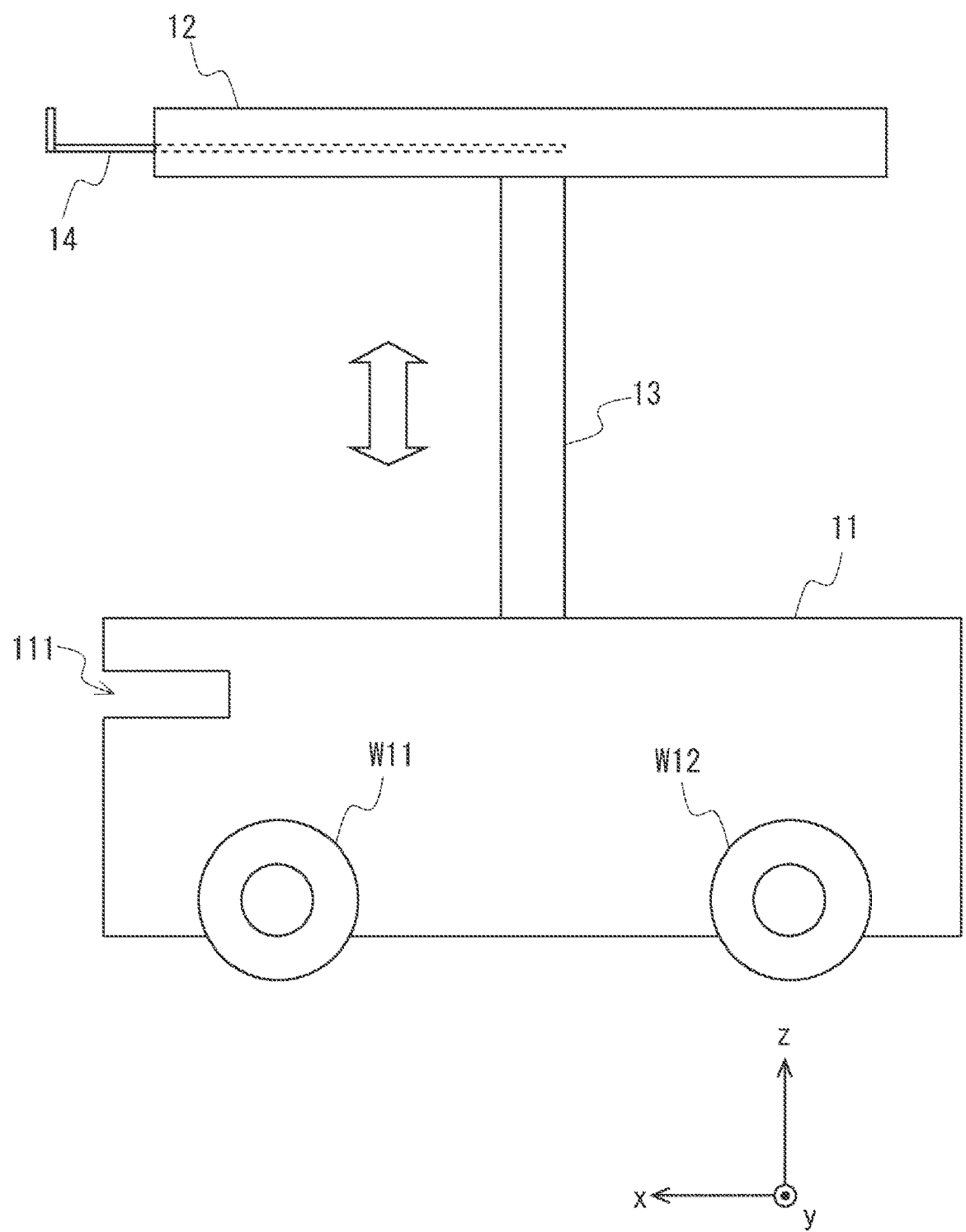
FIG. 6 is a schematic side view showing a configuration of a transport robot according to the embodiment.

Next, the configuration of the transport robot 10 will be described with reference to FIG. 6. FIG. 6 is a schematic side view showing the configuration of the transport robot 10. The transport robot 10 includes wheels W11, W12, the main body portion 11, a top plate 12, a support column 13, and a manipulator 14. Two pairs of the wheels W11 and W12 are rotatably fixed to the lower side of the main body portion 11, and are driven by a drive source (not shown) such as a motor.

As shown in FIG. 6, the top plate 12 is connected to the main body portion 11 via the support column 13 capable of expanding and contracting. The top plate 12 is connected to the upper end of the support column 13, and the transport robot 10 places the luggage 50 on the top plate 12 and transports the luggage 50.

The support column 13 includes, for example, a telescopic type expansion and contraction mechanism, and is expanded and contracted by a drive source (not shown) such as a motor. As shown by the white arrow in FIG. 6, the height of the top plate 12 can be changed by changing the length of the support column 13. Therefore, the transport robot 10 can transport the luggage 50 from any accommodation location in the transport vehicle 20 to any accommodation location in the rack 30.

The manipulator 14 takes in and out the luggage 50 from the transport vehicle 20 and the rack 30. The manipulator 14 is, for example, a telescopic arm that expands and contracts in the horizontal direction. In such a case, the manipulator 14 may expand and contract from the top plate 12 using a guide rail structure. The expansion and contraction mechanism is not limited to the guide rail mechanism, and any configuration can be applied. The manipulator 14 does not need to expand and contract from the top plate 12, and may be provided above the top plate 12.

As shown in FIG. 6, the tip of the manipulator 14 may be provided with a projecting portion that engages with a groove provided in the luggage 50. The shape of the tip of the manipulator 14 is not limited to the shape having the projecting portion, and may have a shape for gripping the luggage 50.

The transport robot 10 engages the luggage 50 accommodated in the rack 30 with the tip of the manipulator 14, and then pulls the tip of the manipulator 14 out from the rack 30. As a result, the transport robot 10 can transfer the luggage 50 to the top plate 12. Also, the transport robot 10 engages the luggage 50 placed on the top plate 12 with the tip of the manipulator 14, and then pushes the tip of the manipulator 14 into the rack 30. As a result, the transport robot 10 can transfer the luggage 50 to the rack 30.

The main body portion 11 is provided with the connecting mechanism 111. The connecting mechanism 111 is connected to the first connecting mechanism 211 of the transport vehicle 20. The connecting mechanism 111 may be formed as a recess as shown in FIG. 6. For example, when a groove is provided around the sensor for causing the transport robot 10 to perform autonomous movement, the groove may be used as the connecting mechanism 111. The connecting mechanism 111 may be formed as a protrusion protruding from the main body portion 11.

The transport robot 10 includes a control unit (not shown) that controls the operation of the wheels W11 and W12, the height of the support column 13, and the operation of the manipulator 14. The control unit (not shown) controls, according to the instruction from the server, the movement of the transport robot 10, the operation in which the transport robot 10 takes in and out the luggage 50 from the rack 30, and the operation in which the transport robot 10 takes in and out the luggage 50 from the transport vehicle 20. The control unit (not shown) causes the transport robot 10 to take out the luggage 50 from the transport vehicle 20 in a state in which the transport robot 10 and the transport vehicle 20 are connected. Further, the control unit (not shown) causes the transport robot 10 to store the luggage 50 in the transport vehicle 20 in a state in which the transport robot 10 and the transport vehicle 20 are connected.

Figure 7:
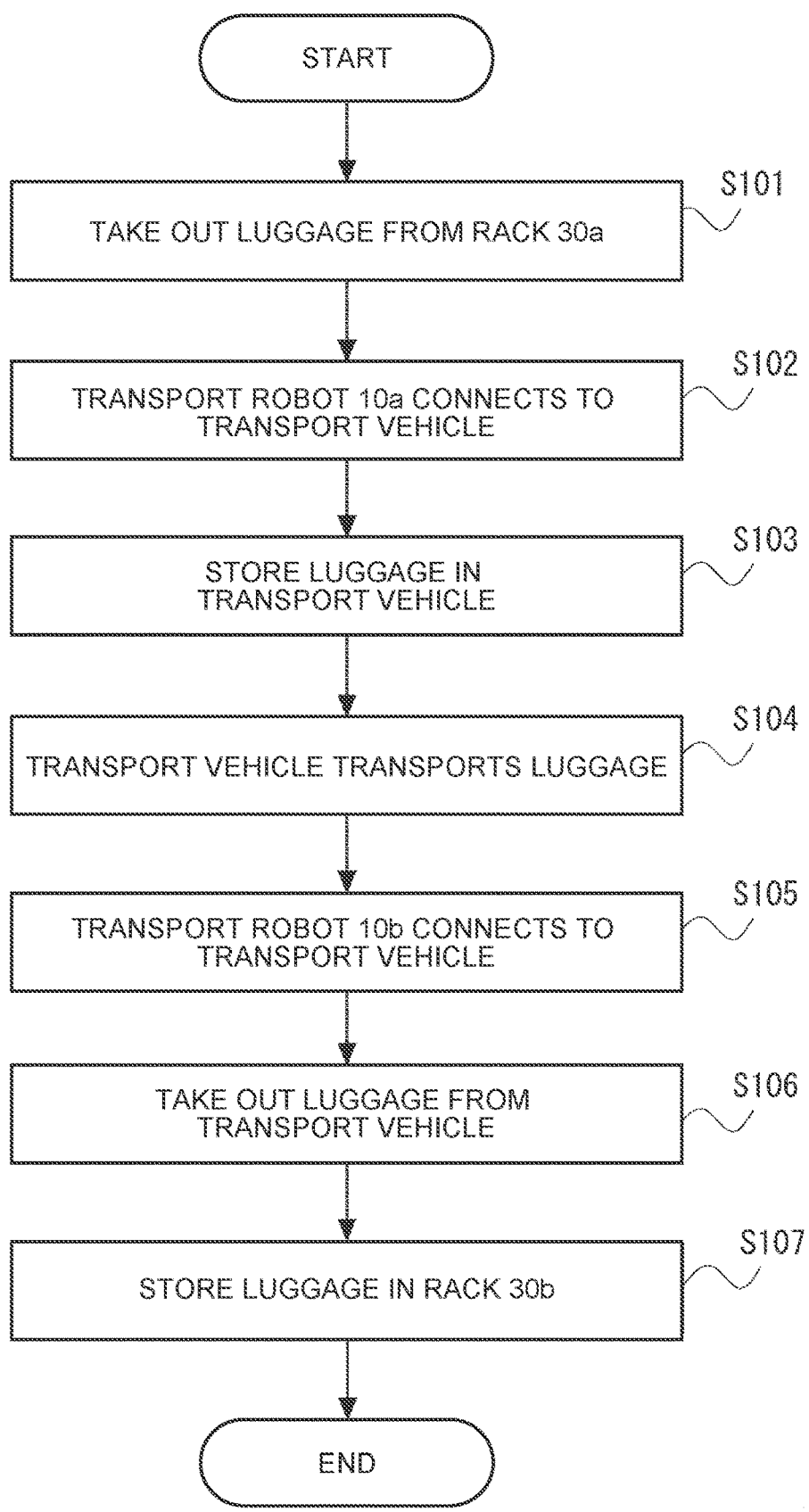
FIG. 7 is a flowchart showing a flow of a transport method according to the embodiment.

FIG. 7 is a flowchart showing a flow of a transport method according to the embodiment. First, a transport robot 10a takes out, from a rack 30a, a luggage 50 that has been instructed by a server, in response to the instruction from the server (step S101).

At this time, the transport robot 10a may take out the luggage 50 from the rack 30a in a state in which the transport robot 10a and the rack 30a are connected. For example, the transport robot 10a may connect the connecting mechanism 111 for connecting to the transport vehicle 20 and the connecting mechanism 311 of the rack 30. This makes it possible to reduce risk of rollover of the transport robot 10 when the transport robot 10 takes in and out the luggage 50.

Next, the transport robot 10a transports the luggage 50 that has been taken out and moves to the side surface of the transport vehicle 20, and connects to the transport vehicle 20 (step S102). For example, the transport robot 10a connects the connecting mechanism 111 that is a recess to the first connecting mechanism 211 of the transport vehicle 20 that is a protrusion.

Figure 8:
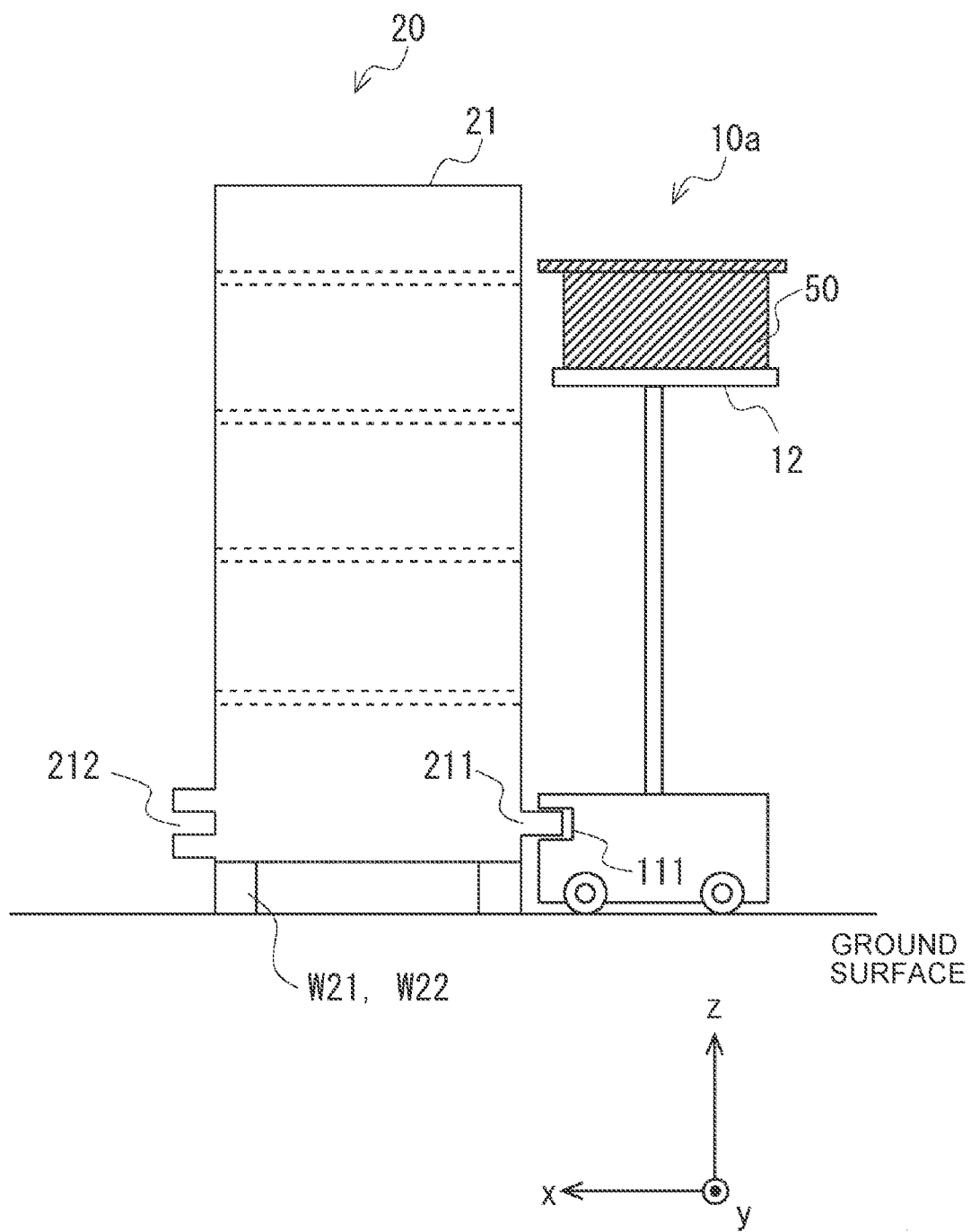
FIG. 8 is a schematic side view showing a state in which the transport robot and the transport vehicle according to the embodiment are connected.

Next, the transport robot 10a raises the top plate 12 and stores the luggage 50 in the transport vehicle 20 using the manipulator 14 (step S103). FIG. 8 is a schematic side view showing a state in which the transport robot 10a and the transport vehicle 20 are connected. The transport robot 10a stores the luggage 50 in the transport vehicle 20 in a state in which the transport vehicle 20 and the transport robot 10a are connected. Therefore, the transport system 1 can reduce risk of rollover of the transport vehicle 20. For example, when the transport vehicle 20 and the transport robot 10a are connected, the width (x direction) of the transport vehicle 20 becomes substantially large, so that it may be considered that the transport vehicle 20 is less likely to roll over.

Figure 9:
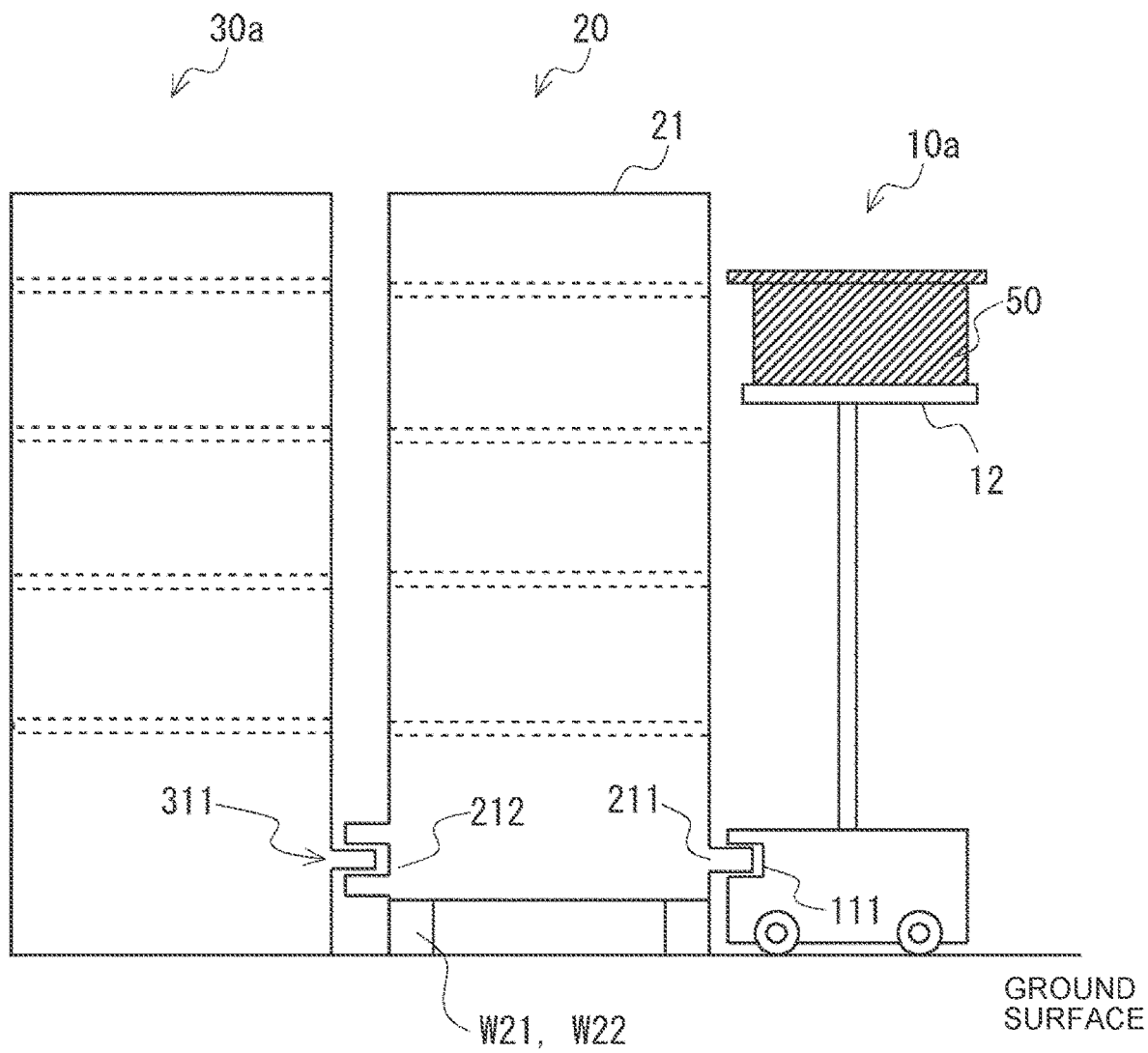
FIG. 9 is a schematic side view showing a state in which the transport vehicle according to the embodiment is further connected to the rack.

At this time, the transport vehicle 20 may be further connected to the rack 30a by using the second connecting mechanism 212. For example, the transport vehicle 20 may move in the lateral direction (x-axis direction) to engage the second connecting mechanism 212 formed as a recess and the connecting mechanism 311 formed as a protrusion. FIG. 9 is a schematic side view showing a state in which the transport vehicle 20 is further connected to the rack 30a. In such a case, the transport robot 10 stores the luggage 50 in the transport vehicle 20 in a state in which the transport vehicle 20 and the rack 30a are further connected. Therefore, the transport system 1 can further reduce risk of rollover of the transport vehicle 20.

Figure 10:
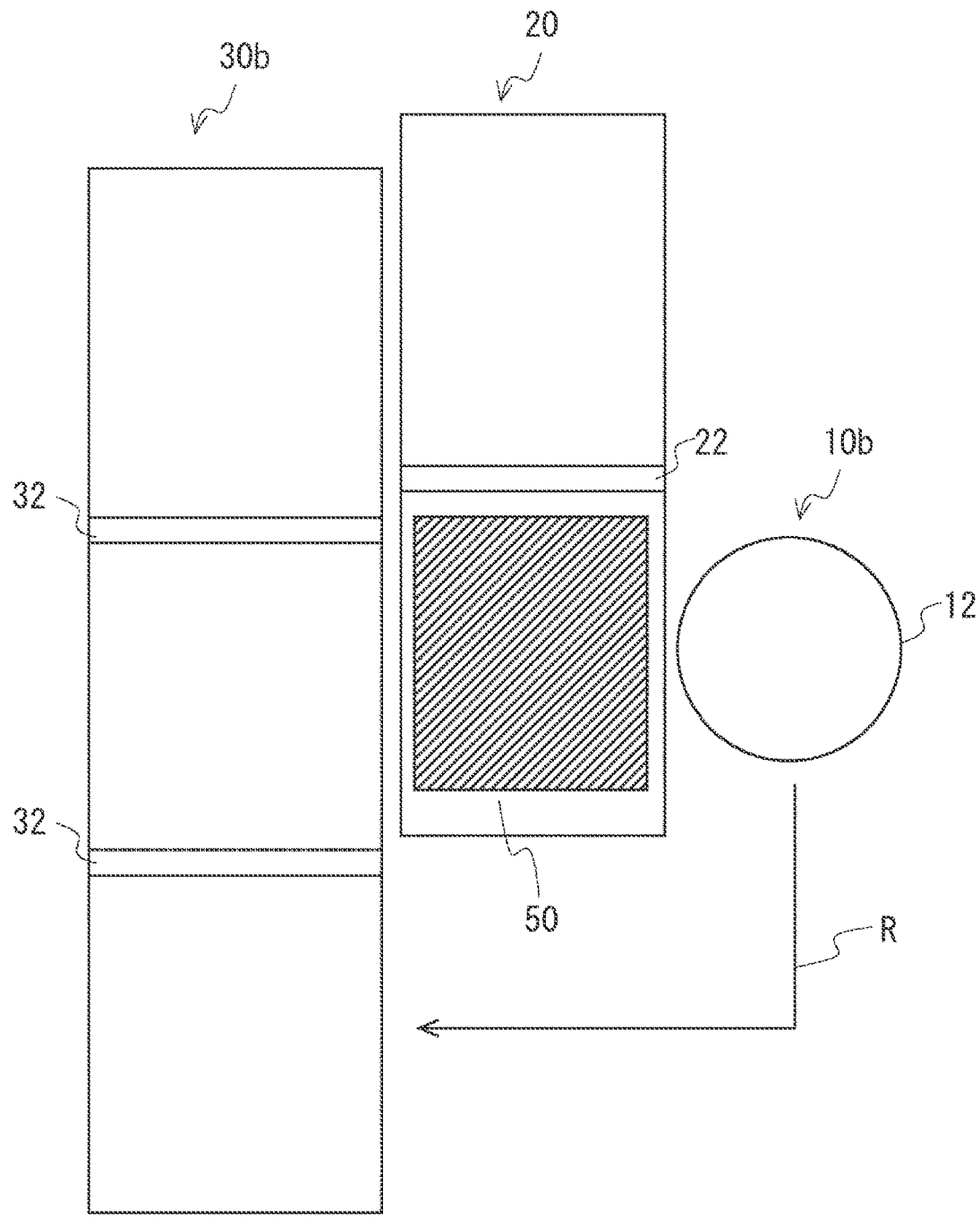
FIG. 10 is a schematic plan view showing a state in which the transport vehicle according to the embodiment stops in front of the rack.

Returning to FIG. 7, after step S103, the transport vehicle 20 transports the luggage 50 (step S104) and stops around the rack 30b. Here, the transport vehicle 20 may stop at a position where it takes less time for the transport robot 10b to transport the luggage 50. FIG. 10 is a schematic plan view showing a state in which the transport vehicle 20 stops in front of the rack 30b. When the transport vehicle 20 stops such that the position where the luggage 50 is accommodated in the transport vehicle 20 and the location where the luggage 50 is to be accommodated in the rack 30b are close to each other, the transport route R by the transport robot 10b is shortened, and the transport time can be shortened.

Here, the transport vehicle 20 may be connected to the rack 30b by using the second connecting mechanism 212. The transport vehicle 20 may be connected to the rack 30 by autonomously moving in the lateral direction (x-axis direction), for example. Further, the transport vehicle 20 may be configured such that the second connecting mechanism 212 protrudes from the housing 21 to engage the connecting mechanism 311 provided in the rack 30b with the second connecting mechanism 212 after the transport vehicle 20 stops with the side surface of the transport vehicle 20 facing the front surface of the rack 30b.

Next, the transport robot 10b moves to the side surface of the transport vehicle 20 and connects to the transport vehicle 20 in the same manner as in step S102 (step S105). Then, the transport robot 10b raises the top plate 12 and takes out the luggage 50 using the manipulator 14 (step S106). The transport robot 10b lowers the top plate 12 after placing the luggage 50 on the top plate 12. Here, the transport robot 10b takes out the luggage 50 from the transport vehicle 20 in a state in which the transport vehicle 20 and the transport robot 10b are connected. Therefore, the transport system 1 can reduce risk of rollover of the transport vehicle 20.

When the transport vehicle 20 and the rack 30b are connected, the transport robot 10b takes out the luggage 50 from the transport vehicle 20 in a state in which the transport vehicle 20 and the rack 30b are further connected. In such a case, the transport system 1 can further reduce risk of rollover of the transport vehicle 20.

Finally, the transport robot 10b travels with the luggage 50 placed on the top plate 12, and then stores the luggage 50 in the rack 30b using the top plate 12 and the manipulator 14

(step S107). Here, the transport robot 10b may store the luggage 50 in the rack 30b in a state in which the transport robot 10b and the rack 30b are connected.

Hereinafter, the effects of the transport system according to the embodiment will be described. When the transport robot that takes in and out the luggage from the transport vehicle comes into contact with the transport vehicle from the lateral direction, or when the transport robot takes in and out the luggage using the manipulator, a lateral load may be applied to the transport vehicle. In particular, when the width of the transport vehicle is short with respect to a wheelbase, there is a high possibility that the transport vehicle will roll over due to a lateral load.

In the transport system according to the embodiment, the transport robot takes in and out the luggage from the transport vehicle in a state in which the transport robot and the transport vehicle are connected. Therefore, the transport system according to the embodiment can reduce risk of rollover of the transport vehicle. Further, when the transport vehicle is connected to the rack, the transport system can further reduce risk of rollover of the transport vehicle.

The present disclosure is not limited to the above embodiment, and can be appropriately modified without departing from the spirit.

What is claimed is:

1. A transport system for transporting a luggage using a transport vehicle and a transport robot, wherein in a state in which the transport vehicle and the transport robot are connected, the transport robot takes out the luggage from the transport vehicle or stores the luggage in the transport vehicle,
    wherein in a state in which the transport robot and a rack that is able to accommodate the luggage are connected, the transport robot stores the luggage in the rack or takes out the luggage from the rack, and
    wherein the transport robot stores, in the rack, the luggage that has been taken out from the transport vehicle, or stores, in the transport vehicle, the luggage that has been taken out from the rack.

2. The transport system according to claim 1, wherein in a state in which the transport vehicle and the rack are connected, the transport robot takes out the luggage from the transport vehicle or stores the luggage in the transport vehicle.

3. The transport system according to claim 1, wherein
    the transport vehicle is provided with a first connecting mechanism that is a protrusion configured to engage a recess provided on the transport robot, and
    the transport vehicle is provided with a second connecting mechanism that is a protrusion configured to engage a recess provided on the rack.

* * * * *